(12) United States Patent
Herold

(10) Patent No.: US 10,131,083 B2
(45) Date of Patent: Nov. 20, 2018

(54) MACHINE AND METHOD FOR PRODUCING AND FILLING CONTAINERS

(71) Applicant: KHS Corpoplast GmbH, Hamburg (DE)

(72) Inventor: Thomas Herold, Bargteheide (DE)

(73) Assignee: KHS CORPOPLAST GMBH, Hamburg (DE)

( * ) Notice: Subject to any disclaimer, the term of this patent is extended or adjusted under 35 U.S.C. 154(b) by 237 days.

(21) Appl. No.: 15/052,017

(22) Filed: Feb. 24, 2016

(65) Prior Publication Data
US 2016/0257057 A1 Sep. 8, 2016

(30) Foreign Application Priority Data

Mar. 6, 2015 (DE) .................. 10 2015 002 795

(51) Int. Cl.
*B29C 49/64* (2006.01)
*B29C 49/42* (2006.01)
(Continued)

(52) U.S. Cl.
CPC .......... *B29C 49/64* (2013.01); *B29C 49/421* (2013.01); *B29C 49/4205* (2013.01);
(Continued)

(58) Field of Classification Search
CPC .............................. B29C 49/64; B29C 49/421
(Continued)

(56) References Cited

U.S. PATENT DOCUMENTS 1,911,603 A * 5/1933 Breuer ................. B05B 7/2416
222/333
4,076,071 A 2/1978 Rosenkranz et al.
(Continued)

FOREIGN PATENT DOCUMENTS

DE 2352926 A1 4/1975
DE 4212583 A1 10/1993
(Continued)

OTHER PUBLICATIONS

Partial machine translation of DE 102008032123A1 dated Jan. 2010 obtained from the espace website. (Year: 2010).*

*Primary Examiner* — Robert B Davis
(74) *Attorney, Agent, or Firm* — Lucas & Mercanti, LLP; Klaus P. Stoffel

(57) ABSTRACT

A machine for producing and filling containers, having: a heating device for thermal conditioning thermoplastic parisons; a blow-molding device for deforming the thermally conditioned parisons into containers by blow-molding or stretch blow-molding; a device for filling the containers with a product; and a transfer device for conveying the containers from the blow-molding device to the filling device. A nozzle arrangement is arranged in the region of the transfer device for impinging a cooling liquid on the containers. The nozzle arrangement has a gas nozzle connected by a gas line to a gas source. The nozzle arrangement has a liquid nozzle connected by a liquid line to a liquid source. The gas nozzle and the liquid nozzle are arranged and oriented relative to one another such that a liquid jet from the liquid nozzle strikes a gas jet from the gas nozzle in an intersection region.

15 Claims, 4 Drawing Sheets

(51) Int. Cl.
*B65B 65/00* (2006.01)
*B65B 3/02* (2006.01)
*B29C 49/58* (2006.01)
*B29C 49/78* (2006.01)
B65B 55/10 (2006.01)
B65B 7/28 (2006.01)
B29C 49/12 (2006.01)
B29C 49/46 (2006.01)
B29K 101/12 (2006.01)
B29K 105/00 (2006.01)
B29L 31/00 (2006.01)
B29K 23/00 (2006.01)
B29K 67/00 (2006.01)
B29C 49/08 (2006.01)

(52) U.S. Cl.
CPC .......... *B29C 49/58* (2013.01); *B29C 49/6418* (2013.01); *B29C 49/786* (2013.01); *B65B 3/022* (2013.01); *B65B 65/003* (2013.01); B29C 49/08 (2013.01); B29C 49/12 (2013.01); B29C 49/46 (2013.01); B29C 2049/4664 (2013.01); B29C 2049/5889 (2013.01); B29C 2949/78663 (2013.01); B29K 2023/04 (2013.01); B29K 2023/12 (2013.01); B29K 2067/003 (2013.01); B29K 2067/046 (2013.01); B29K 2101/12 (2013.01); B29K 2105/258 (2013.01); B29L 2031/712 (2013.01); B65B 7/2835 (2013.01); B65B 55/10 (2013.01)

(58) Field of Classification Search
USPC .................................................. 239/426, 434
See application file for complete search history.

(56) References Cited

U.S. PATENT DOCUMENTS

| | | | |
|---|---|---|---|
| 5,346,386 | A | 9/1994 | Albrecht et al. |
| 6,726,127 | B2* | 4/2004 | Hofherr .................. B05B 1/042 239/432 |
| 7,900,422 | B2* | 3/2011 | Fischer .................. B67C 7/0073 53/167 |
| 8,438,867 | B2 | 5/2013 | Colwell |
| 2007/0235906 | A1 | 10/2007 | Trouillet |
| 2011/0061343 | A1 | 3/2011 | Roithmeier et al. |
| 2011/0146837 | A1 | 6/2011 | Knapp et al. |
| 2011/0154785 | A1* | 6/2011 | Stolte ...................... B29C 49/64 53/452 |

FOREIGN PATENT DOCUMENTS

| | | | |
|---|---|---|---|
| DE | 602005002566 T2 | 6/2008 | |
| DE | 102008032123 A1 * | 1/2010 | ............... B08B 9/34 |
| DE | 102009060655 A1 | 6/2011 | |
| EP | 2295324 A1 | 3/2011 | |
| WO | 0238447 A2 | 5/2002 | |

* cited by examiner

MACHINE AND METHOD FOR PRODUCING AND FILLING CONTAINERS

CROSS-REFERENCE TO RELATED APPLICATIONS

The present application claims priority of DE 10 2015 002 795.6, filed Mar. 6, 2015, the priority of this application is hereby claimed and this application is incorporated herein by reference.

BACKGROUND OF THE INVENTION

The present invention relates to a machine for producing and filling containers, having at least one heating device for the thermal conditioning of parisons composed of a thermoplastic material, having at least one blow-molding device for the deformation of the thermally conditioned parisons to form in each case one container by way of a blow-molding process or a stretch blow-molding process, having at least one filling device for filling the containers with a product, and having a transfer device for conveying the containers from the blow-molding device to the filling device, wherein, in the region of the transfer device, there is arranged at least one nozzle arrangement for the impingement of a cooling liquid on the containers.

The invention also relates to a nozzle arrangement for a machine of said type.

Blow-molding machines with blow-molding stations for producing containers from parisons composed of a thermoplastic material are known. The basic construction of a blow-molding station for container molding is described in DE 42 12 583. Possibilities for temperature control of the parisons are discussed in DE 23 52 926.

Typically, a blow-molding or stretch blow-molding machine of said type has a discharge path arranged downstream of a blow-molding station, which discharge path is designed for the discharge of the finished blow-molded containers.

Alternatively, it is also known for a blow-molding machine to be operated synchronously with a filling machine, wherein the finished containers are handed over from the blow-molding machine to the filling machine by way of a relatively short transfer path. Often, a configuration of said type is referred to as a blocked configuration, or block machine. In some such usage situations, it is necessary for the containers, which still have residual heat, to be cooled along the transfer path in order to prevent damage and deformation during the subsequent filling process. This commonly applies for example in the case of the filling of carbonic acid-containing or carbonated beverages, in the case of which the containers are generally pressurized in order to prevent foaming of the beverage during the filling process.

Container cooling that may be required is generally performed by way of liquid or atomized liquid. In the case of flush cooling or jet cooling with relatively large droplets or closed liquid jets, it is generally possible to achieve relatively high levels of cooling power if a correspondingly large amount of liquid is used. Through atomization of the liquid, it is possible, depending on the droplet size, for moderate levels of cooling power to be achieved even with relatively small amounts of liquid, though said levels of cooling power may not be adequate for certain applications.

For this purpose, it is known, for example, to use a single-substance nozzle or individual nozzle, which can advantageously be used for flush cooling or jet cooling. Such nozzles however exhibit only limited suitability for the nebulization or atomization of the liquid, because for this purpose, water must emerge at relatively high pressure from the nozzle and be atomized in the static air. Here, there is the problem that the functionality of an arrangement of said type is highly dependent on the size of the nozzle opening, and pollution therefore leads very quickly to a reduction in performance or to failure.

Likewise known is the use of two-substance nozzles, in which the water and compressed air are supplied separately and are nebulized to form a cooling mist by way of a single, generally concentric, double nozzle. The mode of operation of double nozzles of said type exhibits a clear dependency on the ratio of water pressure and air pressure, such that for optimum cooling results, both medium pressures must be carefully set and monitored, or increased consumption of compressed air and water must be accepted. Furthermore, such nozzles are limited in terms of their throughput and therefore exhibit only limited suitability for flush cooling or jet cooling.

With the known solutions, there is the problem in particular that a cooling path must be designed in advance, and can then be varied in terms of cooling power only to a very limited extent.

SUMMARY OF THE INVENTION

It is an object of the present invention to specify an alternative to known solutions, wherein in particular, it is sought to achieve a robust mode of operation and a high level of variability.

A machine for producing and filling containers pursuant to the present invention has at least one heating device for the thermal conditioning of parisons composed of a thermoplastic material, having at least one blow-molding device for the deformation of the thermally conditioned parisons to form in each case one container by way of a blow-molding process or a stretch blow-molding process, having at least one filling device for filling the containers with a product, and having a transfer device for conveying the containers from the blow-molding device to the filling device, wherein, in the region of the transfer device, there is arranged at least one nozzle arrangement for the impingement of a cooling mist on the containers, in particular on base regions of the containers. In the machine according to the invention, the nozzle arrangement has a gas nozzle which is connected by way of a gas line to a gas source, and the nozzle arrangement has a liquid nozzle which is connected by way of a liquid line to a liquid source, wherein the gas nozzle and the liquid nozzle are arranged and oriented relative to one another such that a liquid jet from the liquid nozzle strikes a gas jet from the gas nozzle in an intersection region.

Here, the machine according to the invention and the nozzle arrangement according to the invention are of relatively simple construction; in particular, they are easy to provide in terms of construction and advantageously promote relatively inexpensive production and maintenance, and relatively easy handling, in particular setting of an advantageous spray mist, in particular spray cone.

A machine according to the invention has a gas nozzle, which is connected by way of a gas line to a gas source, and a liquid nozzle, which is connected by way of a liquid line to a liquid source. The gas nozzle and the liquid nozzle are arranged and oriented relative to one another such that a liquid jet from the liquid nozzle strikes a gas jet from the gas nozzle in an intersection region. This advantageously permits a relatively simple and relatively robust construction, which can in particular be produced and/or maintained relatively inexpensively.

Furthermore, the machine according to the invention makes it possible for a relatively stable spray cone to be formed. In particular, it is possible here for a spray cone to be oriented such that container regions to be cooled, in particular a container base or base region, is optimally impinged on and cooled by the cooling liquid.

In the machine according to the invention, the gas nozzle and the liquid nozzle are oriented relative to one another, wherein, however, the gas nozzle and the liquid nozzle are provided as separate nozzles. This separate arrangement of separate nozzle makes it possible for the parameters of each individual nozzle to be separately and variably defined, configured and/or set. In particular, parameters such as cross-sectional area and opening width of the individual nozzles can be selected and optimized in each case independently of one another. In this way, the parameters for a gas jet formed from the provided gas by way of the gas nozzle can be predefined independently of a liquid jet formed from the provided liquid by way of the liquid nozzle, and vice versa.

A method for producing and filling containers that is made possible by way of the invention provides, for example, that parisons composed of a thermoplastic material are, after thermal conditioning, in each case molded to form a container in a blow-molding or stretch blow-molding process, and are subsequently impinged on, before a filling process, with a cooling mist, wherein, for the generation of the mist, a gas is provided at a pressure of 1 bar to 10 bar, preferably 4 to 8 bar, more preferably 5 to 7 bar, and a liquid is provided at a pressure of 10 mbar to 100 mbar, preferably 20 to 75 mbar, more preferably 30 to 50 mbar.

A major aspect of this method consists in the provision of a liquid at a relatively lower pressure and the nebulization of said liquid by way of a gas that is provided at a relatively higher pressure. The method thereby advantageously leads to a highly stable and thus easily controllable and orientable spray mist or spray cone, which is composed in particular of droplets of relatively small size. By way of the small droplet size, the cooling action of the evaporation is in this case utilized in a particularly advantageous manner.

In a further method, which can be carried out by way of the invention without structural modification of a machine according to the invention, a high water pressure of, for example, over 1 bar is selected in order to provide a significantly increased amount of liquid. With a gas pressure in the range of 0.1 to 1 bar, preferably 0.2 to 0.8 bar, the liquid jet is diverted and fanned out in targeted fashion. The range of the diverted liquid fan or spray cone can in this case be set in targeted fashion by way of the gas pressure, such that it is for example possible for the liquid fan to be prevented from reaching the mouth region of the container to be cooled, and for the liquid to be prevented from passing into the container. In this method, although significantly more liquid is consumed than in the case of the nebulization described above, a significantly higher level of cooling power is however also achieved.

In the context of the invention, the gas nozzle and the liquid nozzle may advantageously be designed such that, aside from the basic arrangement of the nozzles in space, the orientation or fine adjustment of the nozzles is possible. In this way, it is possible for the two nozzles, after being provided in the basic arrangement, to in particular be oriented such that the gas jet and liquid jet strike one another in an intersection region, and furthermore, the spray cone formed in the intersection region has an optimum orientation and geometry. With correspondingly precise manufacture and mechanically stable design of the nozzle arrangement, the nozzles may however also be oriented fixedly relative to one another.

In a preferred embodiment of the machine according to the invention, the gas nozzle and the liquid nozzle are arranged transversely with respect to one another, wherein the gas nozzle and the liquid nozzle are in particular arranged and oriented such that the gas jet and the liquid jet strike one another in the intersection region at a preferably predefinable angle of 80 to 100 degrees, in particular 85 to 95 degrees, preferably 87 to 93 degrees. In general, the orientation of the nozzle openings relative to one another will correspond to the angle of the jets, as long as influences on the straightness of the jets, in particular owing to gravitational effects, are negligible. If such influences are not negligible, for example owing to a correspondingly large spacing between the two nozzles, it is envisaged that said influences be taken into consideration in the orientation of the nozzles relative to one another in order to realize a predefined angle of the two jets relative to one another in the intersection region of gas jet and liquid jet.

In the context of the invention, the expression "transversely" is to be understood in particular to mean any arrangement of the nozzles at an obtuse angle, in particular between an angle of 45° and an angle of 135°. This is also intended to apply correspondingly to the angle between the intersecting jets.

In a preferred embodiment of the invention, the containers are impinged on with the mist from below, wherein the containers are conveyed in suspended fashion, in particular with the base pointing downward. It is particularly advantageous here for the base of the container or a base region to be sprayed with, and thus cooled by, an upwardly directed spray mist or spray cone.

This advantageously makes it possible for a relatively concentrated cooling mist to be directed toward the base of the container, which is normally relatively hot after the blow-molding process owing to a relatively large wall thickness and which therefore requires additional cooling. Correspondingly, in the machine according to the invention, the nozzle arrangement is then arranged below a conveying path for the containers in the transfer device. In this way, it is made possible for the containers to be cooled, or impinged on with a cooling mist, without intervention into existing or known transfer devices. In particular, the advantages described further above, associated with impingement of cooling mist on the containers from below, are also achieved.

The containers are conventionally conveyed in suspended fashion in the transfer device with the base pointing downward, wherein in this case, the gas nozzle is arranged and oriented for a substantially vertically upwardly directed gas jet. In this configuration, the liquid nozzle is advantageously arranged and oriented for a substantially horizontally directed liquid jet.

Furthermore, an impingement of liquid in the form of mist on the container bases from below simultaneously permits an upwardly directed escape of the evaporation gases that arise during the cooling of the containers, whereby further mist or spray mist can pass substantially unhindered to the container surface to be cooled. At the same time, the mist does not strike the relatively cold regions of the containers, for example the container side walls, or is even kept away from said regions by the rising evaporation gases. The method according to the invention particularly advantageously prevents wetting of cold points of the lateral container wall.

In a preferred embodiment of the machine according to the invention, the nozzle arrangement is mounted so as to be rotatable and/or pivotable. This permits simple orientation of a spray mist or spray cone generated by way of the nozzle arrangement relative to the conveyed containers. In particular, the spray cone can be oriented so as to be oriented directly toward a base or base region of the containers being conveyed past.

The nozzle arrangement is preferably pivotable and/or mounted so as to be pivotable in a plane oriented transversely with respect to a conveying direction of the containers.

This permits a particularly simple design and in particular a particularly simple orientation of the nozzle arrangement and of the spray cone. In particular, it suffices for the nozzle arrangement to be designed to be movable, or mounted so as to be pivotable or rotatable, only in one direction.

With the invention, it is preferably the case that a liquid jet formed from the provided liquid by way of the liquid nozzle is provided as a relatively fine and/or closed jet. This particularly advantageously permits a simple orientation of the liquid jet relative to the gas jet and thus simple, fast and lasting setting of the intersection region, with maximum penetration of both jets.

In a preferred embodiment of the invention, the gas jet is directed substantially vertically upward, and the liquid jet is directed substantially horizontally.

It is advantageously possible to realize a relatively directionally stable spray cone in this way, because no significant gravitational forces act transversely to the main axis, predefined by the gas jet, of the spray cone. Furthermore, such an arrangement makes it possible to realize a spray cone which can be sprayed from below directly onto containers that are transported in particular in suspended fashion.

In a preferred embodiment of the machine according to the invention, the machine comprises a multiplicity of nozzle arrangements, which are preferably connected to a common gas source and/or to a common liquid source. This is realized for example in each case by way of a common gas line and/or by way of a common liquid line respectively.

In this way, it is advantageously made possible to realize a delivery path or cooling path in which the conveyed containers pass nozzle arrangements continuously and/or in close succession and can be impinged on, and correspondingly cooled, by the provided cooling mists.

The problem on which the invention is based is also achieved by way of a nozzle arrangement for a machine according to the present invention. A nozzle arrangement according to the invention comprises a gas nozzle which is connectable to a gas line and a liquid nozzle which is connectable to a liquid line, wherein the gas nozzle and the liquid nozzle are arranged and oriented, or capable of being oriented, such that a liquid jet from the liquid nozzle strikes a gas jet from the gas nozzle in an intersection region.

In a preferred embodiment of the nozzle arrangement according to the invention, the nozzle arrangement comprises a central body which holds the gas nozzle and the liquid nozzle.

In this way, in particular, a structurally simple and mechanically stable nozzle arrangement in the form of a preassemblable component is provided, which is at the same time relatively robust.

Furthermore, it is made possible for the nozzle arrangement to be held in a simple manner, by way of the central body. In particular, the central body may be capable of being mounted or held on or in a machine according to the invention in rotatable and/or pivotable fashion, such that, by rotation and/or pivoting of the central body, the nozzle arrangement itself can likewise be rotated and/or pivoted, whereby orientation and alignment of the cooling mist is made possible.

The central body preferably comprises an internal gas duct for connecting the gas nozzle to a port for a gas line and/or an internal liquid duct for connecting the liquid nozzle to a port for a liquid line. Fast and simple connection of the nozzle arrangement to a gas source and/or to a liquid source is made possible in this way.

Easy maintenance of the nozzle arrangement according to the invention is supported in that the gas nozzle and/or the liquid nozzle are/is detachably connected, in particular screwed in gas-tight and/or liquid-tight fashion, to the central body. At the same time, a detachable connection of the gas nozzle and/or of the liquid nozzle to the central body permits a simple exchange of the nozzles, and thus likewise makes it possible for the nozzles to be selected in each case independently of one another. The number of different components for a broad range of possible combinations of different gas and liquid nozzles is also reduced to a minimum.

In a preferred embodiment of the nozzle arrangement according to the invention, the central body is of substantially L-shaped form.

An L-shaped central body of said type advantageously permits the arrangement of the nozzles on a central body of said type. In particular, the nozzles can advantageously be arranged at a desired angle with respect to one another on the inner side of the limbs of an L-shaped central body of said type. Here, the angle is in particular predefined or determined by the relative arrangement of the inner sides of the two limbs relative to one another.

It is advantageously possible for the L-shaped central body to be of unipartite and thus relatively robust form. For example, the limbs of a unipartite L-shaped central body may be produced by way of a cutting-out process, wherein the inner surfaces of the limbs in which the nozzles can be arranged predefine, by way of a cut at a corresponding angle, a corresponding angle for the orientation of the nozzles. Additionally or alternatively, it is possible for bores, in particular with a thread, to be provided in the central body, and in particular in the limbs thereof, for the purposes of detachable connection of the nozzles to the central body. Here, the angles of the bores perpendicular to the surface or at a certain angle may likewise permit an orientation of the nozzles at a certain angle relative to one another.

In the context of the invention, the central body may also be of multi-part form. In particular, the limbs of an L-shaped central body of multi-part form may be arranged so as to be pivotable relative to one another, such that an angle of the nozzles relative to one another is adjustable.

All of the described embodiments of the invention have the advantage that effective cooling of containers is realized. In particular, a spray mist in the form of a spray cone with a relatively small droplet size can be realized. Here, the evaporation effect of the relatively small droplets is advantageously utilized for the cooling of the containers. Furthermore, by means of all of the described embodiments of the invention, a relatively stable spray cone is provided, which is in particular not substantially influenced by air flows. Furthermore, all of the described embodiments of the invention have the advantage that, owing to the nozzle arrangement according to the invention and/or the method according to the invention and/or the machine according to the invention, the nozzles are relatively insusceptible to blockage. The nozzle arrangement and/or machine according to the invention particularly advantageously make(s) it possible for the gas nozzle and the liquid nozzle to be freely selected, whereby the parameters of the nozzles and/or of the cooling mist to be generated, in particular the pressures and volume flows, can be adapted to the requirements.

The invention will be discussed in more detail below with reference to the appended drawings, from which further advantages, embodiments and features of the invention will emerge.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
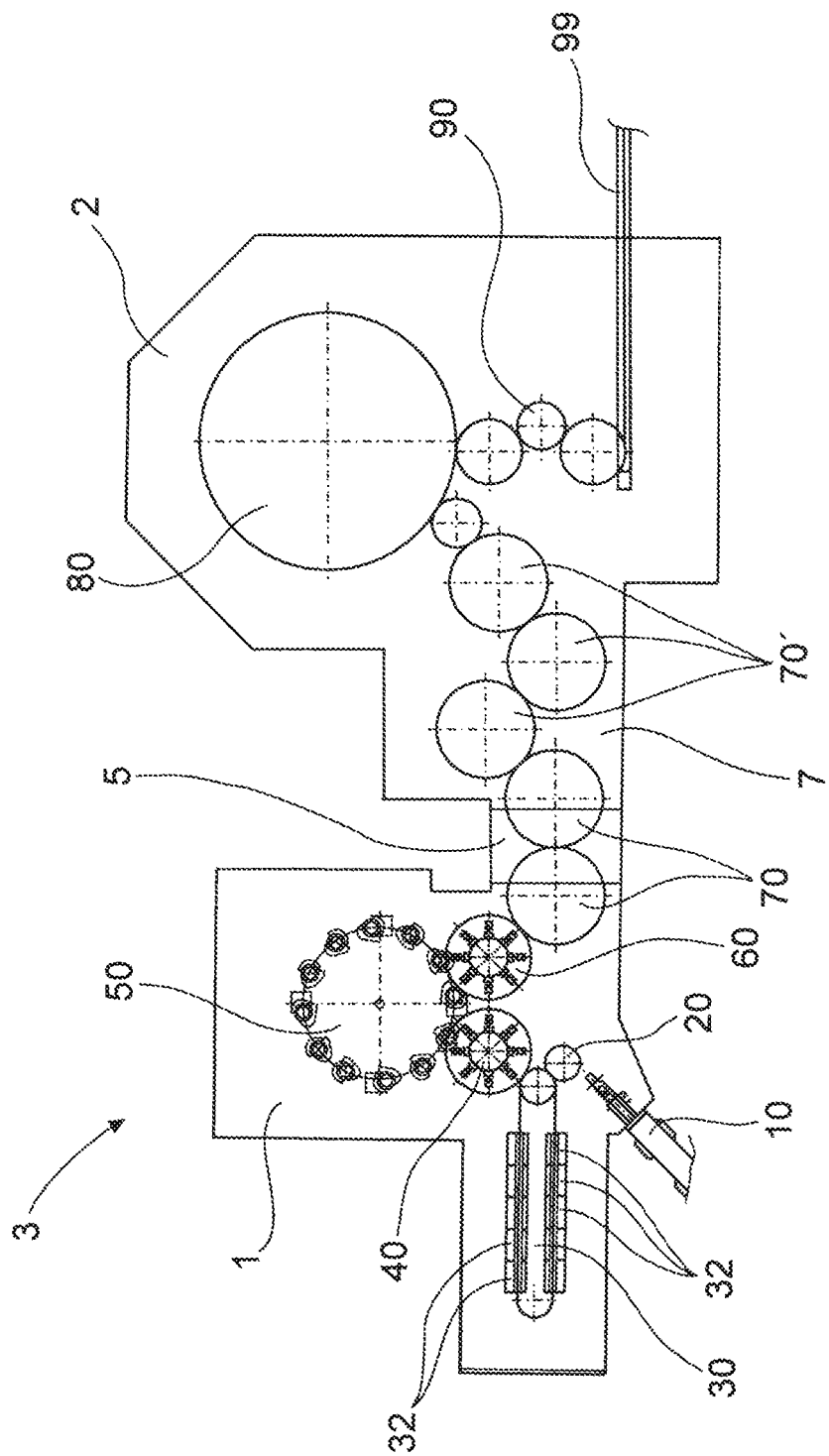
FIG. 1 schematically shows a machine according to the invention for producing and filling containers.

FIG. 1 schematically shows a machine 3 according to the invention for producing and filling containers. The machine 3 is in the form of a block machine, in which a stretch blow-molding machine 1 and a filling machine 2 are connected to one another by way of a transfer path 7 and are operated synchronously.

In the stretch blow-molding machine 1, it is firstly the case that containers are produced from in each case one parison. The generally injection-molded parisons are in this case composed primarily of a thermoplastic material, for example polyethylene terephthalate (PET), polypropylene (PP) or polyethylene naphthalate (PEN). It is basically also possible for biodegradable plastics, for example polylactides (PLA), to be used. Also known are parisons with additives or parisons with integrated intermediate layers, so-called multi-layer parisons, which may likewise be used in the context of the invention.

The stretch blow-molding machine 1 comprises a supply device 10 in which parisons, which are provided as bulk material, are oriented and organized into a line. Furthermore, the supply device 10 has a feed device, for example a run-off rail or a suitable air-conveying path, for subjecting the oriented and lined-up parisons to a feed force and pushing said parisons together to form a gapless row.

From said closed row, the parisons are taken individually by way of a suitable separation device 20, wherein the separation is maintained throughout the entire machine 3. The parisons, or the containers produced therefrom in each case, are thus transported through the machine 3 in particular in a continuous row, and supplied along said transport path to multiple treatment stations, with a controlled spacing to one another.

From the separation device 20, the parisons are handed over firstly to a heating device 30. The heating device 30 shown by way of example is in the form of a tunnel heater with two elongate arrangements with temperature control modules 32, through which the parisons are transported. For this purpose, for example, a multiplicity of transport elements that circulate in the heating device 30 is provided. For this purpose, for example, transport pegs are provided which can in each case be inserted and clamped into the mouth region of a parison such that the parisons are transported in suspended fashion, with the mouth region oriented upward, on the transport pegs. Embodiments of the transport system are however also conceivable in which the parisons are transported with the mouth region oriented downward.

Conceivable temperature control modules 32 are in particular heating modules for uniformly or selectively heating the parisons, cooling modules for cooling in particular the surface of the parisons, and compensation modules without significant external thermal action on the parisons. Depending on the requirements of the individual situation, different temperature control modules 32 are used in a suitable sequence in the heating device 30 in order to achieve desired thermal conditioning of the parisons.

After passing through the heating device 30, the thermally conditioned parisons are handed over, by way of a handover device 40, to a rotating blow-molding wheel 50, in particular to in each case one blow-molding station arranged on the blow-molding wheel 50.

The handover device 40 comprises, for example, a multiplicity of carrying arms with gripper elements, formed in the manner of tongs, for holding in each case one parison, wherein the carrying arms are of pivotable and/or telescopic design in order to realize a pitch alteration between the normally small spacing of the transport elements in the heating device 30 and the relatively large spacing of the blow-molding stations on the blow-molding wheel 50.

In the blow-molding stations, during each revolution of the blow-molding wheel 50, in each case one parison is mechanically elongated and molded, under the action of blown compressed air, to form a container. Subsequently, the container is, by way of a further handover device 60, removed from the blow-molding station and handed over to a transfer path 7.

Similarly to the handover device 40, the handover device 60 has, for example, pivotable and/or telescopic carrying arms in order to permit a pitch alteration between the spacing of the blow-molding stations on the blow-molding wheel 50 and a spacing of holding elements for the containers along the transfer path 7.

The transfer path 7 is formed by multiple transfer star wheels 70, 70' which, on the circumference, each have holding elements, for example tongs or similar gripping elements, for the containers. The spacing of the holding elements on the transfer star wheels preferably corresponds in this case to a pitch spacing predefined by the subsequent filling machine 2, such that no further pitch alteration has to be provided other than at the handover device 60.

The stretch blow-molding machine 1 and the filling machine 2 are in this case separated by a lock 5 which is arranged at the start of the transfer path 7 for the purposes of separating the dry atmosphere of the stretch blow-molding machine 1 from the humid atmosphere in the filling machine 2. Correspondingly, the region of the machine 3 according to the invention with the blow-molding machine 1 is commonly referred to as dry region, and the region of the filling machine 2 is referred to as wet region.

The transfer path 7 is, in the example shown, composed of a total of five transfer star wheels 70, 70', wherein said number of transfer star wheels is expressly to be understood as exemplary. The three rear transfer star wheels 70' as viewed in the conveying direction of the containers, said rear transfer star wheels being situated entirely in the wet region of the machine 3 according to the invention, are formed as a cooling path, in which the containers are impinged on with a cooling liquid. In this way, the containers, which are possibly still warm, are cooled and mechanically stabilized to such an extent that they are not damaged during the subsequent filling process.

From the transfer path 7, the containers pass to a filling machine 2. The latter comprises a rotating filling device 80 with filling stations, in which in each case one container is filled.

Furthermore, the filling machine 2 comprises a closer device 90, in which the filled containers are closed. Subsequently, the containers that have been manufactured from parisons, filled and closed are handed over to a discharge path 99, and exit the machine 3 according to the invention.

Figure 2:
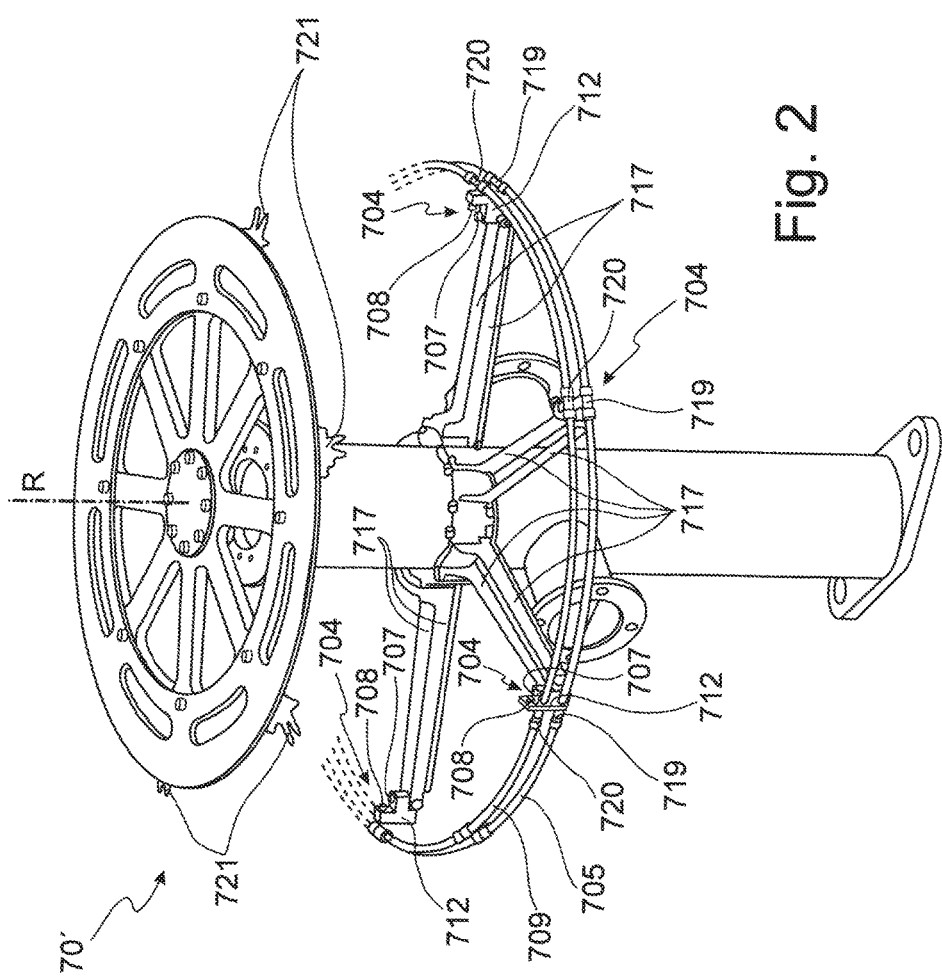
FIG. 2 is a perspective illustration of a detail of a cooling path with a transfer wheel and with a multiplicity of nozzle arrangements according to the invention connected to supply lines, as per a first embodiment according to the invention.

FIG. 2 shows a perspective view of a transfer star wheel 70' of the cooling path. A transfer star wheel 70' of said type is expediently mounted on a post or a pillar so as to be rotatable about a substantially vertical axis of rotation R, and commonly has a multiplicity of holding elements for containers, said holding elements being in the form of passive tongs or clamps 721, for example. The containers are held on the rotating transfer star wheel 70' by the tongs 721 such that the bases of said containers are oriented downward, and here, said containers impinged on with a cooling liquid, for example a mist or a spray cone. For this purpose, nozzle arrangements 704 according to the invention are provided below the transport path of the containers. The nozzle arrangements 704 are connected to two common ring lines 705, 709, wherein one ring line 705 is provided for a pressurized gas, such as for example compressed air, and one ring line 709 is provided for a liquid, such as for example water.

Figure 3A:
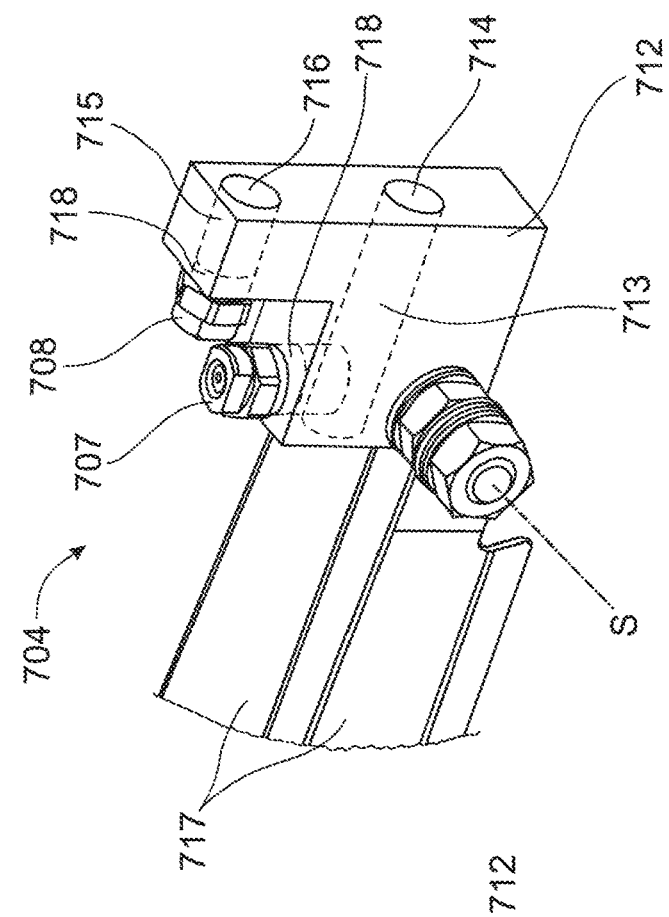
FIGS. 3a and 3b schematically show a nozzle arrangement according to the invention in a perspective illustration.
Figure 3B:
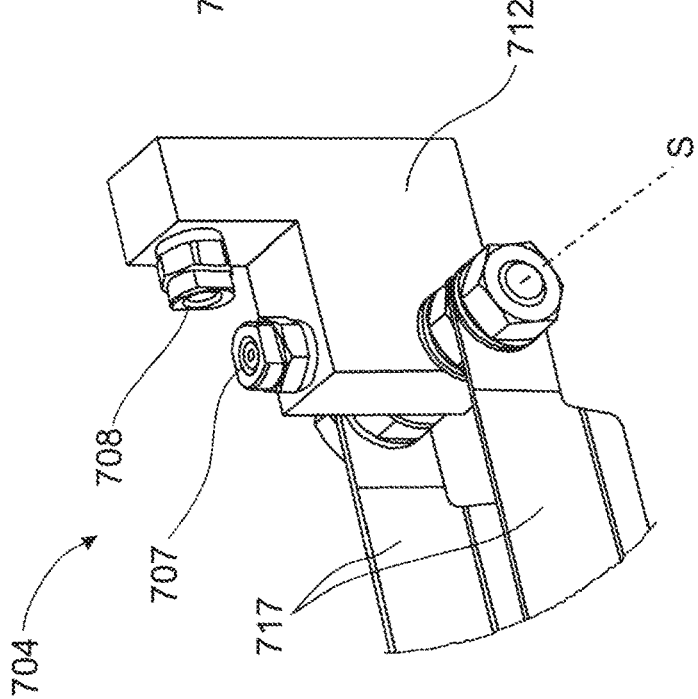
Figure 3C:
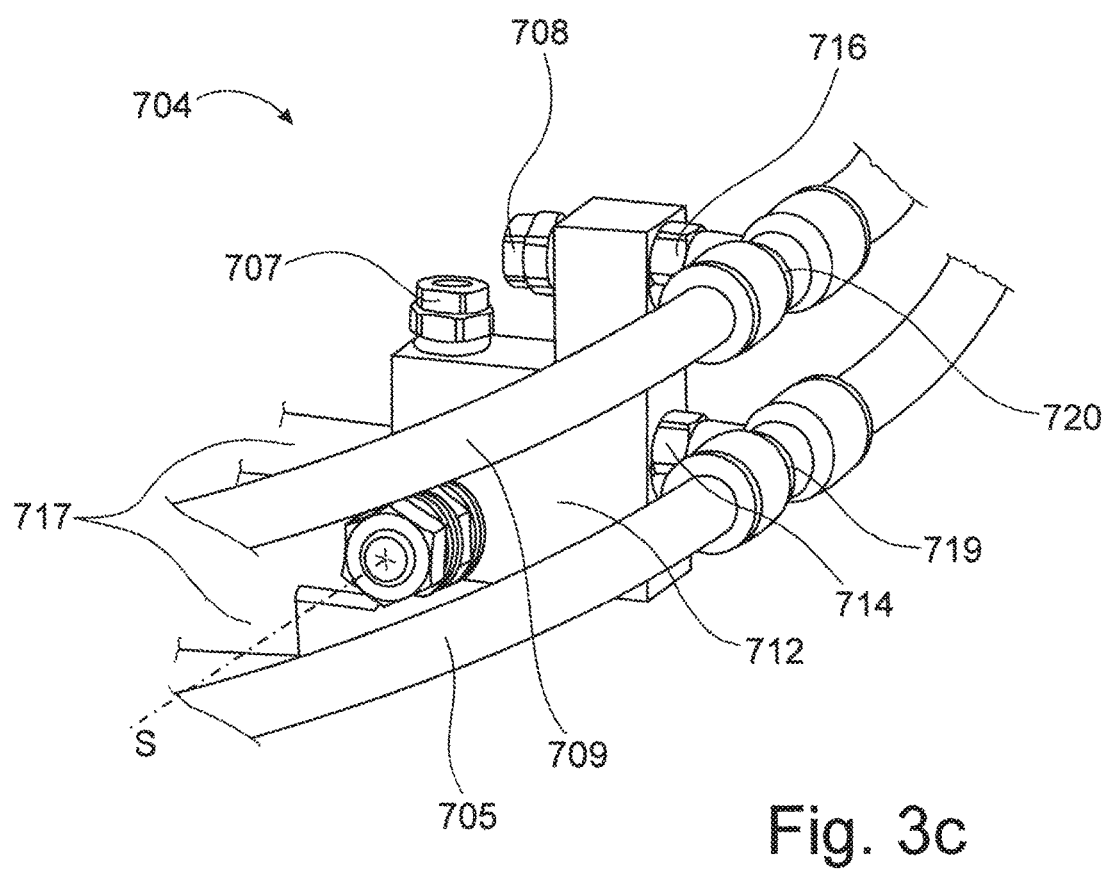
FIG. 3c shows the nozzle arrangement from FIGS. 3a and 3b with exemplary supply lines connected.

A nozzle arrangement 704 according to the invention is illustrated in detail in FIGS. 3a-c. Here, FIG. 3a shows the nozzle arrangement 704 in a perspective illustration, FIG. 3b is a partially cut-away illustration for showing internal flow ducts, and FIG. 3c shows details regarding the connection of the nozzle arrangement 704 to the ring lines 705, 709.

The nozzle arrangement 704 according to the invention comprises a central body 712 which is fastened, so as to be pivotable or rotatable about a pivot axis S, on suitable holders 717 of the transfer star wheel 70'. The central body 712 is of substantially L-shaped form with two limbs which stand transversely to one another. On the inner sides of the limbs there is arranged in each case one nozzle 707, 708, wherein one nozzle 707 is in the form of a gas nozzle, and the other nozzle 708 is in the form of a liquid nozzle.

The limbs of the central body 712 are in this case oriented relative to one another such that gas and liquid jets emerging from the nozzles 707, 708 respectively meet in an intersection region in the free space between the nozzles 707, 708. The angle at which the jets strike one another is in this case dependent in particular on the arrangement of the two limbs of the central body 712 relative to one another.

In the example shown, the central body 712 is of unipartite form, and the arrangement of the limbs relative to one another is thus invariably fixed owing to the construction. It is however also possible in the context of the invention for the central body 712 to be of multi-part form, for example with multiple limbs that are pivotable relative to one another, in order to thereby permit variability of the arrangement and thus of the intersection angle of the two jets.

The nozzles 707, 708 are for example screwed into suitable bores of the central body, which, for this purpose, have corresponding threaded sections 718. This permits easy exchange of the nozzles 707, 708 and thus a fast change of the nozzle width or of the size of the nozzle opening. In the context of the invention, typical nozzle widths are approximately 0.05 to approximately 2.5 mm depending on the throughflow rates of gas and liquid that are desired in the individual situation. Successful testing was performed, for example, with a combination of a gas nozzle of 1.3 mm opening width and a liquid nozzle of 0.23 mm opening width.

The bores of the central body 712 serve simultaneously as a gas duct 713 for connecting the gas nozzle 707 to a port 714 for the gas line 705 and as a liquid duct 715 for connecting the liquid nozzle 708 to a port 716 for the liquid line 709.

The features of the present invention disclosed in the above description, in the claims and in the drawings may be essential both individually, and in any desired combination, to the realization of the invention in its various embodiments.

While specific embodiments of the invention have been shown and described in detail to illustrate the inventive principles, it will be understood that the invention may be embodied otherwise without departing from such principles.

I claim:

1. A machine for producing and filling containers, comprising: at least one heating device for thermal conditioning of parisons composed of a thermoplastic material; at least one blow-molding device for deformation of the thermally conditioned parisons to form in each case one container by way of a blow-molding process or a stretch blow-molding process; at least one filling device for filling the containers with a product; a transfer device for conveying the containers from the blow-molding device to the filling device; and at least one nozzle arrangement in a region of the transfer device for impinging a cooling liquid on the containers, wherein the nozzle arrangement includes a gas nozzle connected by a gas line to a gas source, and a liquid nozzle connected by a liquid line to a liquid source, wherein the gas nozzle and the liquid nozzle are arranged and oriented relative to one another so that a liquid jet from the liquid nozzle strikes a gas jet from the gas nozzle in an intersection region, wherein the nozzle arrangement is mounted so as to be rotatable and/or pivotable.

2. The machine according to claim 1, wherein the gas nozzle and the liquid nozzle are arranged transversely with respect to one another.

3. The machine according to claim 2, wherein the gas nozzle and the liquid nozzle are arranged and oriented so that the gas jet and the liquid jet strike one another in the intersection region at a predefinable angle of 80 to 100 degrees.

4. The machine according to claim 3, wherein the predefinable angle is 85 to 95 degrees.

5. The machine according to claim 4, wherein the predefinable angle is 87 to 93 degrees.

6. The machine according to claim 1, wherein the nozzle arrangement is arranged below a conveying path for the containers in the transfer device, wherein the containers are conveyed in suspended fashion in the transfer device.

7. The machine according to claim 6, wherein the containers are suspended with a base pointing downward.

8. The machine according to claim 6, wherein the gas nozzle is arranged and oriented for a substantially vertically upwardly directed gas jet, and wherein the liquid nozzle is arranged and oriented for a substantially horizontally directed liquid jet.

9. The machine according to claim 1, wherein the nozzle arrangement is rotatable and/or pivotable in a plane oriented transversely with respect to a conveying direction of the containers.

10. The machine according to claim 1, comprising a plurality of nozzle arrangements, which are connected to a common gas source and/or a common liquid source.

11. The machine according to claim 1, wherein the nozzle arrangement includes a central body that holds the gas nozzle and the liquid nozzle.

12. The machine according to claim 11, wherein the central body comprises an internal gas duct for connecting the gas nozzle to a port for the gas line and/or an internal liquid duct for connecting the liquid nozzle to a port for the liquid line.

13. The machine according to claim 11, wherein the gas nozzle and/or the liquid nozzle are/is detachably connected to the central body.

14. The machine according to claim 13, wherein the gas nozzle and/or the liquid nozzle are/is screwed to the central body in a gas-tight and/or liquid-tight manner.

15. The machine according to claim 11, wherein the central body is substantially L-shaped.

* * * * *